United States Patent [19]
Weil

[11] Patent Number: 5,617,900
[45] Date of Patent: Apr. 8, 1997

[54] MULTILAYER FLEXIBILITY RESILIENT THERMAL SHIELDING SLEEVES

[75] Inventor: Thomas L. Weil, Elverson, Pa.

[73] Assignee: Davlyn Manufacturing Co., Inc., Spring City, Pa.

[21] Appl. No.: 94,827

[22] Filed: Jul. 20, 1993

[51] Int. Cl.$^6$ ............................................. F16L 11/12
[52] U.S. Cl. ........................... 138/127; 138/110; 138/149
[58] Field of Search .................................. 138/123, 124, 138/125, 126, 127, 137, 138, 143, 144, 149, 110

[56] References Cited

U.S. PATENT DOCUMENTS

| | | | |
|---|---|---|---|
| 1,086,707 | 2/1914 | Hoagland | 138/149 |
| 3,007,596 | 11/1961 | Matsch | 138/149 |
| 3,240,234 | 3/1966 | Bond et al. | 138/149 |
| 3,948,295 | 4/1976 | Lemont et al. | 138/149 |
| 4,194,536 | 3/1980 | Stine et al. | 138/149 |
| 4,931,326 | 6/1990 | Weil | 138/127 |
| 5,183,079 | 2/1993 | Blin | 138/127 |
| 5,343,895 | 9/1994 | King et al. | 138/149 |

OTHER PUBLICATIONS

Letter of Paul D. Griggs, Sales Manager, Davlyn Manufacturing Co., Inc. to Mark Davey, Flexonics Inc., dated May 31, 1991.

Letter of Paul D. Griggs, Sales Manager, Davlyn Manufacturing Co., Inc., dated Jun. 13, 1991, to Mark Davey, Flexonics Inc.

Primary Examiner—James E. Bryant, III
Attorney, Agent, or Firm—Panitch Schwarze Jacobs & Nadel, P.C.

[57] ABSTRACT

Thermally insulative sleeves include a seamless, hollow, flexibly resilient inner tubular member woven of strand material including at least one metal wire strand, a separate, integral, at least essentially unbroken, metal surface member applied over the inner tubular member extending along and at least essentially completely surrounding the inner tubular member and a flexible outer cover also woven of strand material extending along and completely around the inner tubular member and metal surfaced member securing the metal surface member with the inner tubular member and offering some degree of protection. The inner tubular member may be knit from wire or from a combination of wire and glass fiber yarn, the latter providing some thermal insulative protection. The metal surfaced member may be foil or some other metal covered composite or laminate material sufficiently thin and pliable so as to be deformable by the inner member. The flexible outer mender is preferably wire strand continuously knitted around the other two members. Sleeves provide reflective and, with a glass fiber inner tubular member, insulative thermal protection.

13 Claims, 2 Drawing Sheets

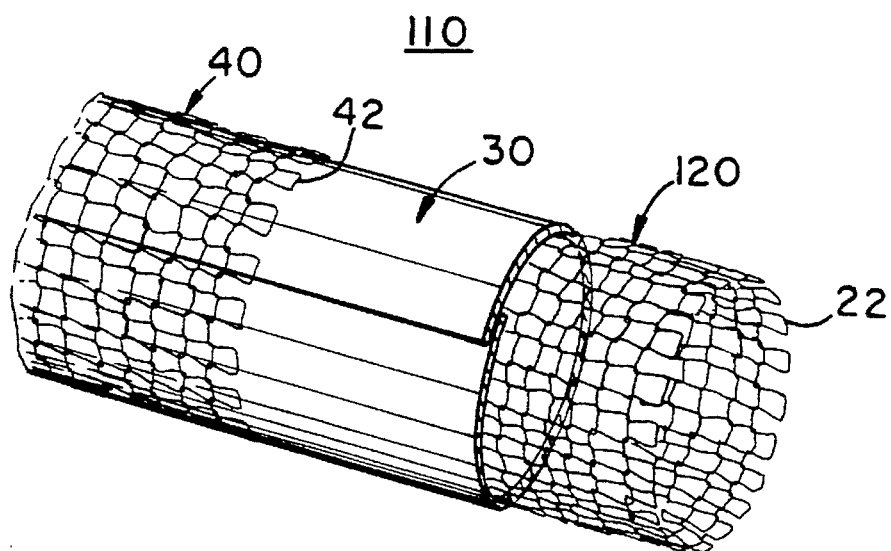
FIG. 4
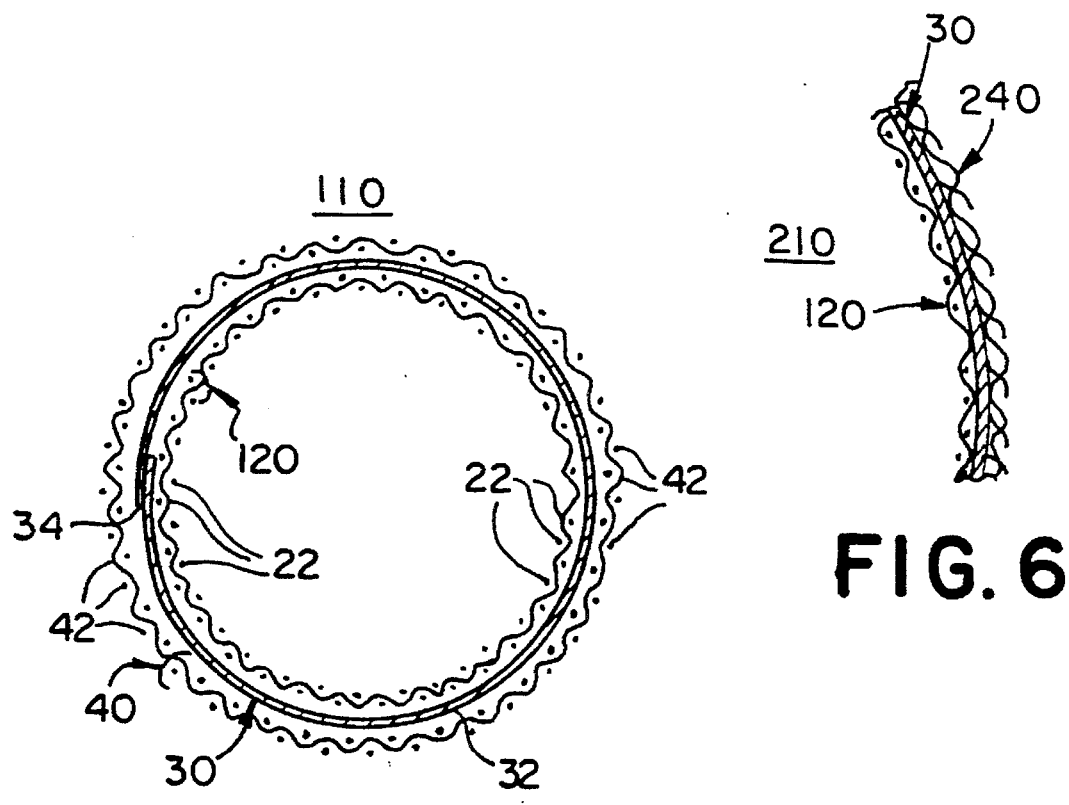
FIG. 5
FIG. 6

MULTILAYER FLEXIBILITY RESILIENT THERMAL SHIELDING SLEEVES

FIELD OF THE INVENTION

The invention relates to tubing and, in particular, to thermal shielding sleeves having a use in certain elevated temperature environments such as engine compartments to provide modest yet necessary amounts of thermal shielding to wiring and/or to vacuum and fluid transfer hoses.

BACKGROUND OF THE INVENTION

A number of different constructions have been previously employed to protect vacuum and fluid carrying hoses and insulated wiring from overheating in engine compartments of automobiles and the like. As improved fuel economy has been sought over the years, automobile manufacturers have attempted to run engines at higher, more efficient operating temperatures. At the same time, techniques and constructions have evolved for cooling the engine in ways in which less air is passed through the engine compartment. As a consequence, operating temperatures within the engine compartment have risen.

Two techniques, which have evolved for thermally protecting hoses and wiring in engine compartments, have been to encase the hoses or wires in a flexible plastic foam or to cover the hose or wiring with a glass fiber sleeve. The former works predominantly by heat insulation while the latter combines heat insulation with heat reflection.

The elevated temperatures which are being encountered in the engine compartment of new vehicles and which might expect to be encountered in such environments in the future, will require significant increases in thicknesses of plastic foam and/or fiberglass material in order to continue to provide adequate thermal protection. For example, temperatures in excess of 1000° F. are encountered in some areas of a motor vehicle engine compartment. The increased material thicknesses not only will increase manufacturing costs, but will also make such covers heavier, bulkier and stiffer, all negative characteristics from an automobile manufacturer's point of view.

Thermally insulating tubular member constructions used in oven gasketing are shown in U.S. Pat. Nos. 4,822,060 and 5,107,623. Both employ glass fiber over a knitted wire tube as a thermal insulating reflecting layer. It is also known to interweave the wire strands with the glass fiber yarns to form a composite woven glass fiber/metal wire tube. This is shown, for example, in U.S. Pat. No. 4,836,080.

It is the object of the present invention to provide improved thermal protection to vacuum and fluid carrying tubes and other cabling for motor vehicles and the like which reduces bulk and weight, and increases flexibility all at a cost level comparable to existing protection.

SUMMARY OF THE INVENTION

The invention is a thermally insulative sleeve comprising a hollow, flexibly resilient inner tubular member woven of strand material including at least one metal wire strand; a separate, integral, at least essentially unbroken metal surfaced member applied over the inner tubular member extending along and at least essentially completely surrounding the inner tubular member, the metal surfaced member being sufficiently thin and pliable to be deformable by the flexibly resilient inner tubular member; and a flexible outer cover woven of strand materials along and completely around the inner tubular member and the heat retarding layer securing the heat retarding layer to and exposing the heat retarding layer on the inner tubular member.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, it should be understood that the invention is not limited to the precise arrangements and instrumentalities shown. In the drawings, which are diagrammatic:

FIG. 4 is a perspective, partially sectioned view of a second embodiment sleeve of the present invention; and FIG. 5 is a transverse, local cross-sectional view of the device of FIG. 4 taken along the lines 5—5; and FIG. 6 is a portion of a transverse, local cross-sectional view of a third embodiment sleeve of the present invention.

DETAILED DESCRIPTION OF PREFERRED EMBODIMENTS

Figure 1:
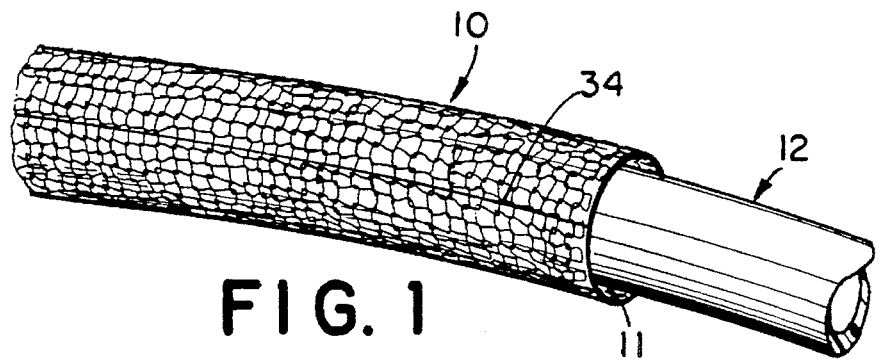
FIG. 1 is a perspective view of thermal shielding sleeve of the present invention with a separate inner member shielded by the sleeve.
Figure 2:
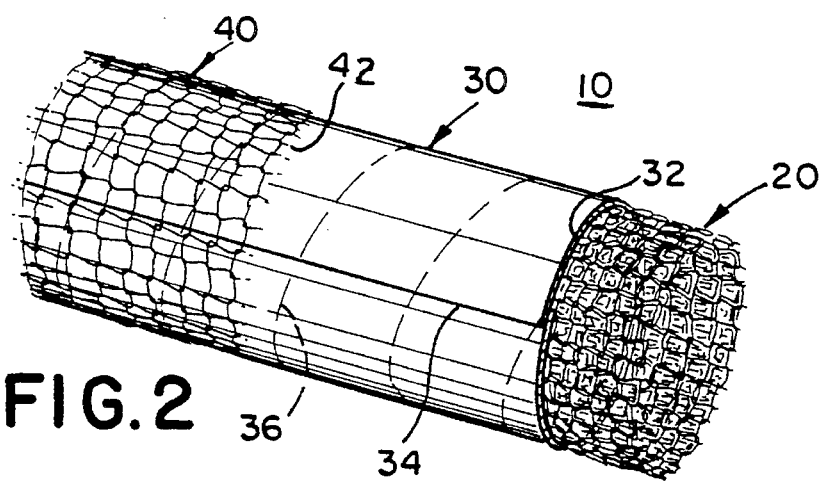
FIG. 2 is a perspective, partially sectioned view of a first embodiment sleeve of the present invention.
Figure 3:
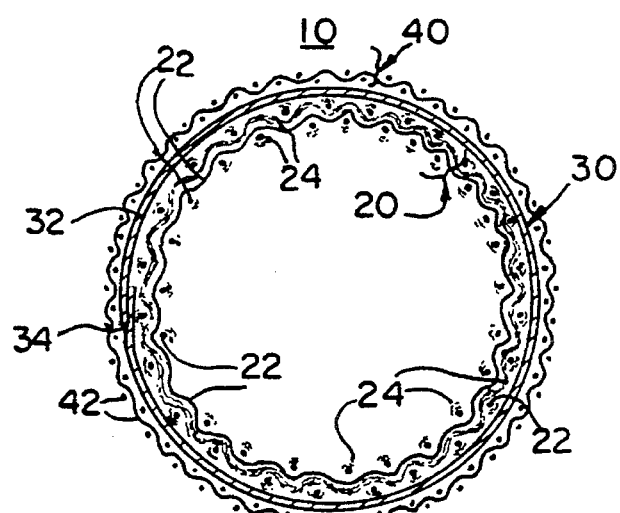
FIG. 3 is a transverse, local cross-sectional view of the sleeve of FIG. 2 taken along the lines 3—3.

Referring to the drawings, like numerals are employed for the indication of like elements throughout. A first embodiment sleeve of the present invention is shown in FIGS. 1 through 3 and designated generally at 10 having a hollow interior 11. A separate member 8, which is a length of fluid or vacuum hose or tubing but may be insulated wiring or the like, is preferably releasably and removably received in the hollow interior 11 where it can be protected by sleeve 10 from elevated exterior temperatures.

The major components of sleeve 10 are shown in FIGS. 2 and 3 and are a resiliently flexible, inner tubular member indicated generally at 20, a separate, integral, flexible, heat retarding member 32 forming a heat retarding layer, which is indicated generally at 30 and is applied along and completely around the inner tubular member 20, and a flexible outer cover 40 extending along and completely around the inner tubular member 20 and the heat retarding layer 30. The hollow interior 11 of sleeve 10 is defined by the interior of tubular member 20.

Member 20 is woven of strand material including at least one preferably continuous metal wire strand 22. Preferably woven with metal wire, strand 22 is at least one strand 24 of glass fiber yarn. The strands 22 and 24 are woven together, preferably simultaneously knitted together as a single, composite "two ended" strand into a continuous, seamless tube. Preferably the member 20 consists essentially of one or more metal wire strands 22 and one or more glass fiber yarns 24. Metal wire strand 22 is hardened sufficiently to impart flexible resilience to the inner tubular member 12 such that the member 12 will "spring" back to a generally original tubular cross-sectional configuration when the sleeve 10 is compressed and then released after compression. The stainless steel wire strand(s) providing the resilience of inner tubular member 20 should be at least half hard or harder with a tensile strength of about 156,000 psi or more, but preferably no more than about 330,000 psi to permit trouble free knitting of the wire. Preferably, all of the metal wire strands 22 used in inner tubular member 20 are stainless steel for corrosion resistance and are fully hardened to between about 270,000 and 330,000 psi in tensile strength, for resilience and strength.

The heat retarding layer 30 is applied over the inner tubular member 20 at least essentially surrounding and extending along the length of the inner tubular member 20. The heat retarding member layer 30 is preferably provided by pliable, heat reflective metal sheet 32, preferably in the form of a thin foil. The preferred metal foil sheet 32 may be extended longitudinally along inner tubular member 20, parallel with the inner tubular member 20, and, more preferably, wrapped around the inner tubular member 20 so as to at least abut and preferably at least slightly overlap upon itself such that the layer 30 formed by the foil sheet 32 extends completely around and along the inner tubular member 20. A longitudinally extending seam indicated by line 34 is created by applying foil sheet 32 in parallel to the tubular member 20 in this manner and wrapping the sheet around member 20. More preferably, an elongated strip of foil sheet, for example about 1¼ inches wide may be wrapped spirally along the inner tubular member 20, with successive wraps at least abutting and preferably overlapping one another by about ¼ inch or more, generating a spiral seam indicated by broken spiral line 36. Preferably sheet 32 is about 1 mil thick aluminum foil or a foil of another metal (e.g. stainless steel) which can be inexpensively formed with a very smooth and highly reflective surface and sufficiently thin, pliable and yet strong so as to provide reflective thermal protection while easily conforming to deformations of the inner tubular member 20 without hindering the resilient restitution of the inner tubular member 20 to its original shape, all without damage. While pure metal foils are currently preferred, it is believed that other flexible materials, for example composites or laminates with metallized reflective surfaces such as Mylar®, might also be used as sheet 32 in at least some applications of the invention.

Flexible outer cover 40 is provided to secure the heat retarding layer 30 on the inner tubular member 20 in use, and to provide a degree of protection to that layer. The outer cover 40 preferably is also woven of strand material 42. Preferably the strand material 42 is thin metal wire knitted completely around and along the retarding layer 30 and inner tubular member 20. Generally speaking, the hardness of the wire 42 of flexible cover 40 is less than the hardness of at least one and preferably less than the hardness of all wire 22 used in the inner tubular member 20. Preferably, the wire 42 of cover 40 is woven sufficiently tightly around the heat retarding layer 30 and inner tubular member 20 such that wire 42 conforms closely to the configuration of the inner tubular member 20. In this way, the pliant foil sheet 32 or other material forming the flexible heat retarding layer 30 is pressed against the outer cover 40 by the inner tubular member 20, which preferably is the most resilient of the components of the sleeve 10. The wire of cover 40 is preferably thin, about 6 mils in diameter, so that essentially all of the outer surface of preferred metal foil layer 30 is exposed on the outside of the sleeve to optimize thermal reflection away from the hollow interior 11 of the sleeve 10, and is preferably unhardened or only unhardened or only quarter hard (less than about 175,000 psi tensile strength), preferably Type 304 stainless steel for pliability, strength and corrosion resistance.

While a metal wire outer sleeve is presently preferred, it may be found desirable to provide a woven outer sleeve of either a glass fiber or a composite of glass fiber and wire for additional thermal insulation. A portion of one such sleeve is shown diagrammatically in FIG. 6 and is indicated generally at 210. The inner member may be a composite of glass fiber and wire tube like inner member 20, while outer member 240 is a essentially woven glass fiber. If a composite inner member 20 were used it should utilize a much softer and less resilient wire than in the inner member 20. Not depicted but also possible are an essentially wire inner member like member 120, with a composite glass fiber and wire outer member like outer member 140, or a composite wire/glass fiber inner member like 20 with either a composite wire/glass fiber outer member or an essentially glass fiber woven outer member, like 240, all with a separate, heat retarding, pliable metal or metallized heat retarding layer 30 surrounding the inner tubular member and sandwiched between that member and the outer tubular member.

Sleeve 10 represents a departure from conventional, thermally insulative sleeves previously employed for engine compartment applications in that it combines a very thin, lightweight, heat reflective metal outer layer 30 to protect the contents of the sleeve 10 from external radiant heating with an inner, fiberglass layer formed by yarn 24 to retard thermal conduction heating of the hollow center 11 through the inner tubular member 20.

Fabrication of sleeve 10 is as follows. The inner tubular member 20 may be obtained from a supplier such as Davlyn Manufacturing Company, Inc. of Spring City, Pa. or ACS Industries, Woonsocket, Rhode Island or made in a conventional fashion. See, for example, U.S. Pat. No. 4,836,080 incorporated by reference herein, although a much higher proportion of wire to fiberglass is preferred than is disclosed in that patent. Member 20 is woven and preferably knitted from a preferably full hard, type 304 stainless steel wire between about 4 and 8 mils in diameter and preferably about 6–7 mils in diameter and a glass fiber yarn size G37 1/0 (texturized) from PPG, Inc., Pittsburgh, Pa. in a continuous jersey knit. The wales and courses per inch of the knit will vary with the size of the inner tubular member 20 which may vary from about ¼ inch to 2 inches in inner diameter. For example, an inner tubular member 20 having an inner diameter of 5/16 inches, which is suitable for receiving one-quarter inch OD hose, tube or cable, might be made with one strand of 6 mil wire, and one strand of 037 1/10 glass fiber yarn knitted in parallel in 10 to 14 wales and 12 to 16 courses per inch. A ¾ inch ID tubular member 20 receiving a ⅝th inch OD hose, tube or cable might be knit of the same two strands with 12 to 18 wales and 10 to 14 courses/inch. The resulting inner tubular member 20 is continuous and seamless.

Next, a preferably 1 mil thick aluminum foil sheet 32 about 1¼ inches wide is preferably spirally wrapped completely around and continuously along the length of the inner tubular member 20 with at least about a ¼" overlap, either manually or mechanically by means of a suitable folder or strip applicator. For a spiral application of heat retarding sheet 32, the inner tubular member 20 can be rotated so that the inner tubular member 20 rotates past a stationary foil strip applicator or the foil strip applicator can be made to rotate around a fed, non-rotating tubular member 20. The inner tubular member 20 with heat retarding layer 30 formed by foil sheet 32 is preferably passed through a second, continuous knitter which preferably seamlessly knits outer cover 40 around the heat retarding layer 30 and inner tubular member 20. Preferably the outer layer 40 consists essentially of stainless steel wire unhardened or only partially hardened to a degree less than the stainless steel wire preferably used in the inner tubular member 20. The wire diameter used in outer cover 40 might range from 5 to 8 mils. The outer cover knit might range from 10 wales and 7 courses per inch on up, depending on size.

FIGS. 4 and 5 depict a second preferred embodiment of the invention in the form of a sleeve indicated generally at 110. Sleeve 110 differs from sleeve 10 only in the fabrication of inner tubular member 120. Rather than being a combination of glass fiber yarn and metal wire strands, inner tubular member 120 preferably consists essentially of woven, preferably knitted, metal wire preferably only a single strand 22, again preferably hardened sufficiently to spring the sleeve 110 back to a generally original tubular cross-section configuration when the sleeve 110 is compressed and then released after compression. Sheet 32 of heat retarding layer 30 is again applied over inner tubular member 120. Flexible outer cover 40 is again preferably knitted from stainless steel wire strand seamlessly entirely around and along layer 30 and inner tubular member 120.

Inner tubular member 110 is preferably knitted essentially of at least one strand of Type 304 stainless steel wire at least 4 mils in diameter, desirably between about 4 and 8 mils in diameter and preferably about 6 mils in diameter, at least half hard and preferably full hard with a tensile strength of between about 270,000 to 330,000 psi and having at least 10 wales with at least 12 courses per inch for a tube having a 5/16 inch I.D. to receive 1/4 inch O.D. hose, tube or cable. Knitted wire is presently preferred for use in the outer cover. If glass fiber is used without wire as shown in FIG. 6, it may be desirable to braid the glass fiber onto the inner tubular member and heat retarding layer 30 to maintain the tightness of the weave and to be secure the layer 30 to the inner tubular member. It may also be desirable to saturate such a glass fiber outer jacket with resin, at least where the device is cut, to prevent the glass fiber from unraveling.

It will be appreciated that other constructions are possible. For example an outer jacket of fiber glass can be woven onto an outer jacket of wire or a layer of silicone rubber extruded onto the device in a conventional manner. Also, the devices of the present invention can be inserted into or incorporated into other tubular sleeves and structures.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A thermally insulative sleeve comprising:
    a seamless, hollow, flexibly resilient, inner tubular member woven of strand material including at least one metal wire strand;
    a separate, integral, at least essentially unbroken, metal surfaced member applied over the inner tubular member extending along and at least essentially completely surrounding the inner tubular member, the metal surfaced member being sufficiently thin and pliable to be deformable by the flexible, resilient inner tubular member; and
    a flexible outer cover woven of strand material extending along and completely around the inner tubular member and the metal surfaced member, thereby securing the metal surfaced member on the inner tubular member;
    wherein the at least one metal wire strand of the inner tubular member is hardened sufficiently to spring the sleeve back to a generally original tubular cross-section configuration when the sleeve is compressed and released after compression.

2. The sleeve of claim 1, wherein the inner tubular member consists essentially of fully hardened stainless steel wire.

3. The sleeve of claim 1, wherein the weave of the inner tubular member further includes glass fiber yarn.

4. The sleeve of claim 3 wherein the inner tubular member consists essentially of said stainless steel wire strands and glass fiber yarns knitted together.

5. The sleeve of claim 1, wherein the metal surfaced member consists essentially of pliable metal sheet wrapped around the inner tubular meter.

6. The sleeve of claim 3, wherein the metal surfaced member consists essentially of pliable metal sheet wrapped around the inner tubular member.

7. The sleeve of claim 4, wherein the metal surfaced member consists essentially of pliable metal sheet wrapped around the inner tubular member.

8. A thermally insulative sleeve comprising:
    a seamless, hollow, flexibly resilient, inner tubular member woven of strand material including at least one metal wire strand;
    a separate, integral, at least essentially unbroken, metal surfaced member applied over the inner tubular member extending along and at least essentially completely surrounding the inner tubular member, the metal surfaced member being sufficiently thin and pliable to be deformable by the flexible, resilient inner tubular member; and
    a flexible outer cover woven of strand material extending along and completely around the inner tubular member and the metal surfaced member, thereby securing the metal surfaced member on the inner tubular member;
    wherein the inner tubular member consists essentially of the woven strands of wire and glass fiber yarn.

9. The sleeve of claim 8, wherein the metal surfaced meter consists essentially of pliable metal sheet wrapped around the inner tubular meter.

10. A thermally insulative sleeve comprising:
    a seamless, hollow, flexibly resilient, inner tubular member woven of strand material including at least one metal wire strand;
    a separate, integral, at least essentially unbroken metal surfaced member applied over the inner tubular member extending along and at least essentially completely surrounding the inner tubular member, the metal surfaced member being sufficiently thin and pliable to be deformable by the flexible resilient inner tubular member; and
    a flexible outer cover woven of strand material extending along and completely around the inner tubular member and the metal surfaced member, thereby securing the metal surfaced member on the inner tubular member;
    wherein the woven outer cover comprises at least one wire strand having a hardness less than a hardness of the at least one wire strand of the inner tubular member.

11. The sleeve of claim 10, wherein the outer tubular cover consists essentially of knitted wire strands and wherein the knitted wire of the outer cover has an average hardness less than an average hardness of the at least one metal wire strand of the inner tubular member.

12. The sleeve of claim 10, wherein the metal surfaced meter consists essentially of pliable metal sheet wrapped around the inner tubular meter.

13. The sleeve of claim 11, wherein the metal surfaced meter consists essentially of pliable metal sheet wrapped around the inner tubular meter.

* * * * *